United States Patent
Ruhland et al.

(10) Patent No.: US 11,918,944 B2
(45) Date of Patent: Mar. 5, 2024

(54) PARTICLE DISCHARGE DEVICE, FILTER ASSEMBLY, AND METHOD

(71) Applicant: MANN+HUMMEL GmbH, Ludwigsburg (DE)

(72) Inventors: Klaus-Dieter Ruhland, Meckenheim (DE); Michael Kaufmann, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/205,645

(22) Filed: Mar. 18, 2021

(65) Prior Publication Data
US 2021/0299601 A1    Sep. 30, 2021

(30) Foreign Application Priority Data
Mar. 24, 2020    (DE) .................... 10 2020 108 055.7

(51) Int. Cl.
| | |
|---|---|
| *B01D 45/18* | (2006.01) |
| *B01D 46/00* | (2022.01) |
| *B01D 46/28* | (2006.01) |
| *B01D 46/48* | (2006.01) |

(52) U.S. Cl.
CPC ......... *B01D 45/18* (2013.01); *B01D 46/0046* (2013.01); *B01D 46/28* (2013.01); *B01D 46/48* (2013.01)

(58) Field of Classification Search
CPC .... B01D 45/18; B01D 46/0046; B01D 46/28; B01D 46/48; B01D 46/4272; B01D 50/20; B01D 36/045; F02M 35/022; F02M 35/024
See application file for complete search history.

(56) References Cited

U.S. PATENT DOCUMENTS

| | | | | |
|---|---|---|---|---|
| 3,816,982 | A * | 6/1974 | Regnault ................ | B01D 50/20 55/432 |
| 4,388,091 | A * | 6/1983 | Khosropour ....... | B01D 46/2411 55/432 |
| 4,758,141 | A * | 7/1988 | Radermacher ........ | F04C 15/068 137/513.5 |
| 5,704,522 | A * | 1/1998 | Orgeolet ............... | F16K 15/148 222/571 |
| 10,544,757 | B2 * | 1/2020 | Fujisaki ............. | F02M 25/0836 |

(Continued)

FOREIGN PATENT DOCUMENTS

| | | | |
|---|---|---|---|
| DE | 4240048 A1 | 6/1994 | |
| DE | 202005009097 U1 * | 11/2006 | ........... F02M 35/024 |

(Continued)

*Primary Examiner* — Dung H Bui

(57) ABSTRACT

A particle discharge device for a filter assembly has a housing with a valve seat, wherein the valve seat surrounds at least partially a symmetry axis of the housing. One or more particle discharge flaps embodied as one piece together with the housing are provided. The one or more particle discharge flaps are moveable from a closed state into an open state for discharging particles from the filter assembly. The one or more particle discharge flaps are resting against the valve seat in the closed state. A filter assembly is provided with a filter housing having a particle discharge socket in which the particle discharge device is arranged.

9 Claims, 8 Drawing Sheets

(56) References Cited

U.S. PATENT DOCUMENTS

| | | | | |
|---|---|---|---|---|
| 2007/0184238 | A1* | 8/2007 | Hockaday | B32B 27/36 |
| | | | | 428/98 |
| 2010/0329911 | A1 | 12/2010 | Borst et al. | |
| 2012/0121449 | A1* | 5/2012 | Borst | F16K 15/031 |
| | | | | 137/511 |
| 2012/0301341 | A1* | 11/2012 | Ota | F16K 15/16 |
| | | | | 417/559 |
| 2015/0377107 | A1* | 12/2015 | Fujita | F01N 3/32 |
| | | | | 251/318 |
| 2016/0051921 | A1* | 2/2016 | Jin | B01D 45/12 |
| | | | | 55/432 |
| 2016/0101684 | A1* | 4/2016 | Yamaguchi | F16K 24/04 |
| | | | | 137/512 |
| 2017/0030301 | A1* | 2/2017 | Fujisaki | F02M 35/104 |
| 2019/0072058 | A1* | 3/2019 | Kumazawa | B01D 46/4272 |
| 2019/0203703 | A1* | 7/2019 | Shabanian | F04B 43/043 |
| 2019/0309861 | A1* | 10/2019 | Williams | F16K 7/123 |
| 2020/0262560 | A1* | 8/2020 | Hoang | B01D 45/16 |
| 2020/0346158 | A1* | 11/2020 | Rieger | B01D 46/2403 |
| 2021/0018109 | A1* | 1/2021 | Beuschel | F16K 31/002 |
| 2021/0039030 | A1* | 2/2021 | Spengler | B01D 45/18 |
| 2021/0402339 | A1* | 12/2021 | Fogelberg | A47L 9/16 |
| 2022/0241711 | A1* | 8/2022 | Wyatt | B01D 45/16 |

FOREIGN PATENT DOCUMENTS

| | | | | |
|---|---|---|---|---|
| DE | 102006011844 A1 | | 9/2007 | |
| DE | 102013003739 A1 | | 9/2014 | |
| DE | 102014218184 A1 | | 3/2016 | |
| DE | 102015220686 A1 | | 4/2017 | |
| DE | 102018110660 A1 | * | 11/2019 | ......... B01D 46/0046 |
| KR | 20180070986 A | * | 6/2018 | ............ B01D 46/48 |
| WO | WO-2006084106 A1 | * | 8/2006 | ......... B01D 46/0036 |

* cited by examiner

PARTICLE DISCHARGE DEVICE, FILTER ASSEMBLY, AND METHOD

CROSS-REFERENCE TO RELATED APPLICATIONS

This application claims a priority date of 24 Mar. 2020 based on prior filed German patent application No. DE 10 2020 108 055.7, the entire contents of the aforesaid German patent application being incorporated herein by reference to the fullest extent permitted by the law.

TECHNICAL FIELD

The invention concerns a particle discharge device for a filter assembly, a filter assembly with such a particle discharge device, and a method for producing such a particle discharge device.

BACKGROUND OF THE INVENTION

In the automotive field, in particular in the field of trucks, construction machines or agricultural vehicles, meaning in case of so-called "heavy-duty" applications, so-called round air filter assemblies with centrifugal preseparation of particles or so-called cyclone separators are often used. By means of the preseparation of the particles, it is possible to keep particle loading of the actual filter element at a minimum. In this way, the service life of the employed filter element is increased.

EP 2 703 059 A2 shows a filter receptacle with a housing which comprises a dust discharge at which a particle discharge device in the form of a lip valve, in particular in the form of a so-called "duckbill valve", is provided. This lip valve can be opened, for example, by means of a pulsating operation of an internal combustion engine coupled to the filter receptacle in order to discharge the particles from the filter receptacle.

WO 2011/124675 A1 describes a cyclone separator that is also provided with a dust discharge with such a lip valve at its housing.

SUMMARY OF THE INVENTION

It is therefore the object of the invention to provide an improved particle discharge device for a filter assembly.

The object is solved by a particle discharge device for a filter assembly that comprises a housing and at least one particle discharge flap which is embodied as one piece together with the housing, wherein the at least one particle discharge flap can be moved from a closed state into an open state for discharge of particles from the filter assembly, and wherein the at least one particle discharge flap in the closed state is resting against a valve seat of the housing that at least partially surrounds a symmetry axis of the housing.

The particle discharge device can also be referred to as a particle removal device, particle discharge valve or dust discharge valve. The particle discharge device is suitable in particular for discharging or removing particles from the filter assembly, in particular from a filter housing of the filter assembly. The housing of the particle discharge device is preferably tubular and substantially embodied with rotational symmetry in relation to the symmetry axis. The symmetry axis is preferably oriented parallel to a gravity direction or coincides therewith.

In the context of the invention, "one piece" or "single part" means that the housing and the particle discharge flap form a common component and are not assembled of different components. This means in particular that the housing and the particle discharge flap cannot be separated from each other without causing destruction. In particular, the housing and the particle discharge flap are monolithically formed. In the context of the invention, "monolithic" means that the housing and the particle discharge flap are manufactured throughout of the same material.

The particle discharge flap is preferably a flat or planar component that is oriented in particular perpendicularly to the symmetry axis in the closed state. In the closed state, the particle discharge flap is preferably arranged inside, in particular at least partially inside, the housing. Preferably, upon starting operation of an internal combustion engine connected to the filter assembly, the particle discharge flap is moved from the open state into the closed state. This means that the particle discharge flap is moved by a vacuum generated by the internal combustion engine from the open state into the closed state. The particle discharge flap can be moved as often as desired from the closed state into the open state and vice versa. In this context, the open state is preferably an initial state of the particle discharge flap. This means that the particle discharge flap is in the open state as long as the internal combustion engine is not operating.

The valve seat is in particular annular. The valve seat can completely surround the symmetry axis. In this case, the valve seat is annularly closed. However, it is also possible that the valve seat surrounds only partially the symmetry axis. In this case, the valve seat is not circumferentially closed. For example, the valve seat, viewed along a circumferential direction of the housing, may extend only by about two thirds around the housing. The valve seat is in particular oriented perpendicularly to the symmetry axis. In the context of the invention, "perpendicular" can be understood in particular as an angle of $90°\pm10°$, preferably of $90°\pm5°$, further preferred of $90°\pm3°$, further preferred of $90°\pm1°$, further preferred of precisely $90°$.

By providing the valve seat which at least partially surrounds the symmetry axis of the housing and against which the particle discharge flap is resting in the closed state, a reduced installation space, viewed along the symmetry axis of the particle discharge device, can be achieved in comparison to a previously explained lip valve.

In embodiments, the at least one particle discharge flap is elastically deformable for moving the latter from the closed state into the open state. In the context of the invention, "elastic deformability" is understood as a reversible deformability. This means that the particle discharge flap can be moved as often as desired from the closed state to the open state and vice versa. Upon moving the particle discharge flap from the closed state into the open state, the particle discharge flap is bent or curved in particular in an arc shape. In this way, a large outlet cross section for the particles to be discharged is achieved.

In embodiments, the at least one particle discharge flap can be moved from the closed state into the open state by means of a weight force of the particles acting on the at least one particle discharge flap. This means that the particle discharge flap, due to the weight force of the particles, automatically moves from the closed state into the open state. As soon as the weight force of the particles is no longer acting on the particle discharge flap, the latter automatically returns from the open state into the closed state. Moving from the open state into the closed state can be realized also by a vacuum produced by the internal combustion engine or at least can be assisted by it. Moreover, the particle discharge flap can also be moved, additionally or optionally, by a load change of an internal combustion engine connected to the filter assembly from the closed state into the open state and vice versa.

In embodiments, the particle discharge device comprises moreover a first particle discharge flap, a second particle discharge flap, and a center stay which connects the first particle discharge flap and the second particle discharge flap with the housing to form one piece. Preferably, the center stay is arranged perpendicularly to the symmetry axis. The center stay extends transversely through the housing, wherein the two particle discharge flaps are connected to the center stay by hinge sections. In particular, the housing comprises a tubular base section with which the center stay is connected to form one piece, in particular a monolithic piece.

In embodiments, the particle discharge device comprises moreover a bottom, which closes off the housing at an end face at least partially, and precisely one particle discharge flap which is connected with the bottom to form one piece. The bottom closes off approximately one third of a cross-sectional area of the housing, respectively, of the base section of the housing. As a result, the particle discharge flap in the closed state covers two thirds of the cross-sectional area of the housing or of the base section of the housing. The particle discharge flap can be connected by the aforementioned hinge section to the bottom. In this way, a large outlet cross section for the particles to be discharged is achieved.

In embodiments, the particle discharge device is a one-piece injection molded plastic component manufactured from an elastomer. For example, the particle discharge device can be made of rubber, of an ethylene propylene diene rubber (EPDM), of an acrylonitrile butadiene rubber (NBR) or of a thermoplastic elastomer (TPE), such as, for example, a thermoplastic polyurethane (TPU). By means of the use of the aforementioned materials, the particle discharge device, and in particular the particle discharge flap, is elastically deformable.

In embodiments, the valve seat completely surrounds the symmetry axis. This means the valve seat, as mentioned before, is annularly closed. As an alternative, the valve seat can also surround only partially the symmetry axis. In this case, the valve seat can also be of an annular shape. However, the valve seat is then circumferentially open.

Moreover, a filter assembly with a filter housing and such a particle discharge device is proposed, the latter being arranged at a particle discharge socket of the filter housing.

The filter housing comprises preferably a filter housing pot and a filter housing cover that is detachably connected to the filter housing pot. A filter element is received in the filter housing pot. The filter element can be exchanged by removal of the filter housing cover from the filter housing pot. Preferably, the particle discharge socket is provided at the filter housing cover. The particle discharge device is pushed onto the particle discharge socket. The elastic deformability of the particle discharge device enables a simple pushing on of the latter onto the particle discharge socket. The filter assembly is in particular configured to filter fluids, such as, for example, air, or other gases, liquids, in particular liquid operating media of a vehicle, in particular of a motor vehicle, such as oil, water, gasoline, kerosene or urea solution. In particular, the filter assembly is an air filter assembly. The filter assembly can be used in motor vehicles, watercraft, rail vehicles, agricultural vehicles, construction machines, aircraft or the like. Moreover, the filter assembly can also be used in immobile applications such as, for example, in building technology.

Moreover, a method for producing a particle discharge device, as explained above, for a filter assembly is proposed. The method comprises the steps: a) producing a housing, and b) producing at least one particle discharge flap formed as one piece together with the housing.

The steps a) and b) are preferably performed simultaneously by means of a plastics injection molding tool. In this context, the housing is produced as one piece, in particular monolithically, together with the particle discharge flap. However, this does not preclude that different materials, for example, of different elasticity, are used for the housing and for the particle discharge flap. For this purpose, for example, a two-component plastics injection molding process can be used.

In embodiments, after or in the step b) the at least one particle discharge flap is separated by means of a separating manufacturing method from the valve seat of the housing. For example, the particle discharge flap can be separated by means of a blade or a knife from the valve seat. Alternatively, a laser cutting method or a water jet cutting method can be employed also. Alternatively, the particle discharge device can also be produced such that a separation of the particle discharge flap from the valve seat is not required. For example, for this purpose a gap between the particle discharge flap and the valve seat can be provided in the plastics injection molding tool. In this case, a separation of the particle discharge flap from the valve seat is not required. The particle discharge device can then be used immediately after removal from the plastics injection molding tool.

BRIEF DESCRIPTION OF THE DRAWINGS

In the Figures, same or functionally the same elements, if nothing to the contrary is indicated, are provided with the same reference characters.

DESCRIPTION OF PREFERRED EMBODIMENTS

Figure 1:
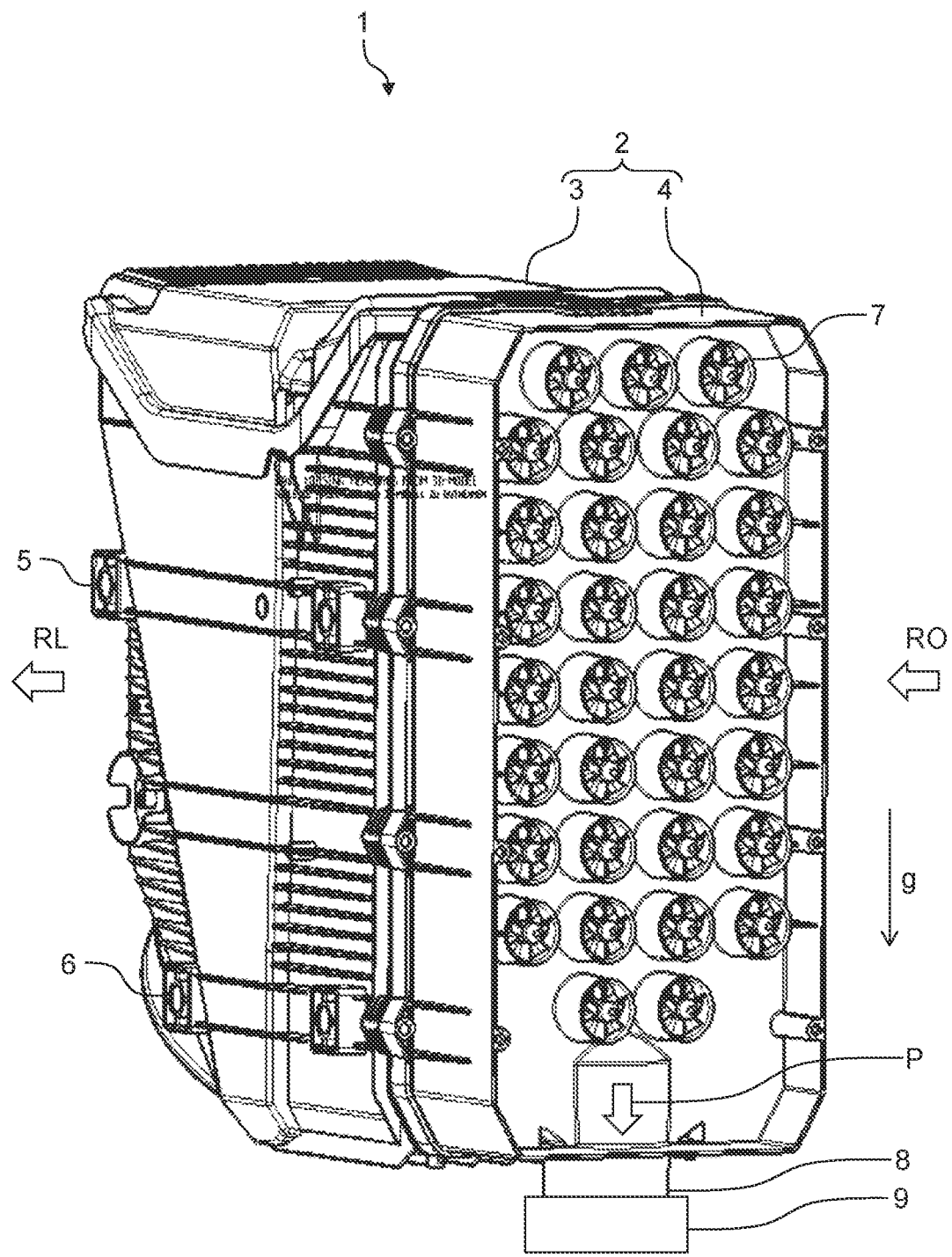
FIG. 1 shows a schematic perspective view of an embodiment of a filter assembly.

FIG. 1 shows a schematic perspective view of an embodiment of a filter assembly 1. The filter assembly 1 can be suitable for filtering water, urea solution, air, oil, or fuels, such as diesel fuel, kerosene or gasoline. In particular, the filter assembly 1 is used in motor vehicles, in particular in passenger cars, trucks, construction vehicles or agricultural machines, in watercraft, in rail vehicles or in aircraft. Moreover, the filter assembly 1 can be used, for example, in building technology. Preferably, the filter assembly 1 is suitable for a use under high dust load or under a high particle load. The filter assembly 1 is in particular an air filter assembly and is suitable for filtering combustion air of an internal combustion engine.

The filter assembly 1 comprises a filter housing 2 with a filter housing pot 3 and a filter housing cover 4. The filter housing pot 3 and the filter housing cover 4 can be embodied, for example, as plastic components, in particular as injection molded plastic components. In this context, the filter housing cover 4 is removable from the filter housing pot 3 and detachably connected to the filter housing pot 3.

The filter housing pot 3 can be fastened fixedly in or at a vehicle, for example, at a supporting car body structure of the vehicle. For this purpose, the filter housing pot 3 comprises integrally formed fastening sections 5, 6. In the filter housing pot 3, an exchangeable filter element (not illustrated) is received. After removal of the filter housing cover 4 from the filter housing pot 3, the filter element can be removed from the filter housing pot 3 and thus exchanged.

The filter housing cover 4 comprises a plurality of cyclone separators 7 of which in FIG. 1 only one is identified by a reference character. The cyclone separators 7 are suitable for separating particles P from the raw air RO supplied to the filter assembly 1. The raw air RO from which the particles P have been removed flows then through the filter element and exits the filter assembly 1 as clean air RL. The particles P encompass, for example, small stones, dust, sand, soil, plant parts or the like. The cyclone separators 7 separate particles P from the raw air RO in the manner of a centrifugal separator. The cyclone separators 7 are covered by means of a cover that is not illustrated.

Viewed in relation to a gravity direction g, the filter housing cover 4 comprises at a lowest point or lower region a particle discharge socket 8 for discharging the particles P from the filter housing 2 or from the filter housing cover 4. The particle discharge socket 8 is of a tubular configuration and is preferably arranged such that it extends in the gravity direction g. At the particle discharge socket 8, a particle discharge device 9 is fastened which will be explained later on. The particle discharge device 9 can also be referred to as particle discharge valve or dust discharge valve.

In operation of an internal combustion engine with such a filter assembly 1, the latter is connected to an intake manifold of the internal combustion engine. In operation, the internal combustion engine sucks in raw air RO that is laden with particles P. The particles P are separated by means of the cyclone separators 7 from the raw air RO to be purified and, due to the force of gravity, they collect at the lower region of the filter housing cover 4, respectively, in the particle discharge socket 8.

Thus, a preseparation of the particles P in the manner of a centrifugal separator is realized. This type of particle separation can also be referred to as rotational separation or centrifugal separation. In order to remove or discharge the collected particles P from the filter housing 2, the particle discharge socket 8 is provided with the particle discharge device 9.

By means of this preseparation, more than 80% of the particles P contained in the raw air RO can be separated from the latter. This means a preseparation efficiency of more than 80% can be achieved. The pre-purified raw air RO from which the particles P have been removed flows from a raw side of the filter element to a clean side thereof. In doing so, by means of a filter medium of the filter element the residual particles P are separated. The clean air RL flows then to the internal combustion engine.

Figure 2:
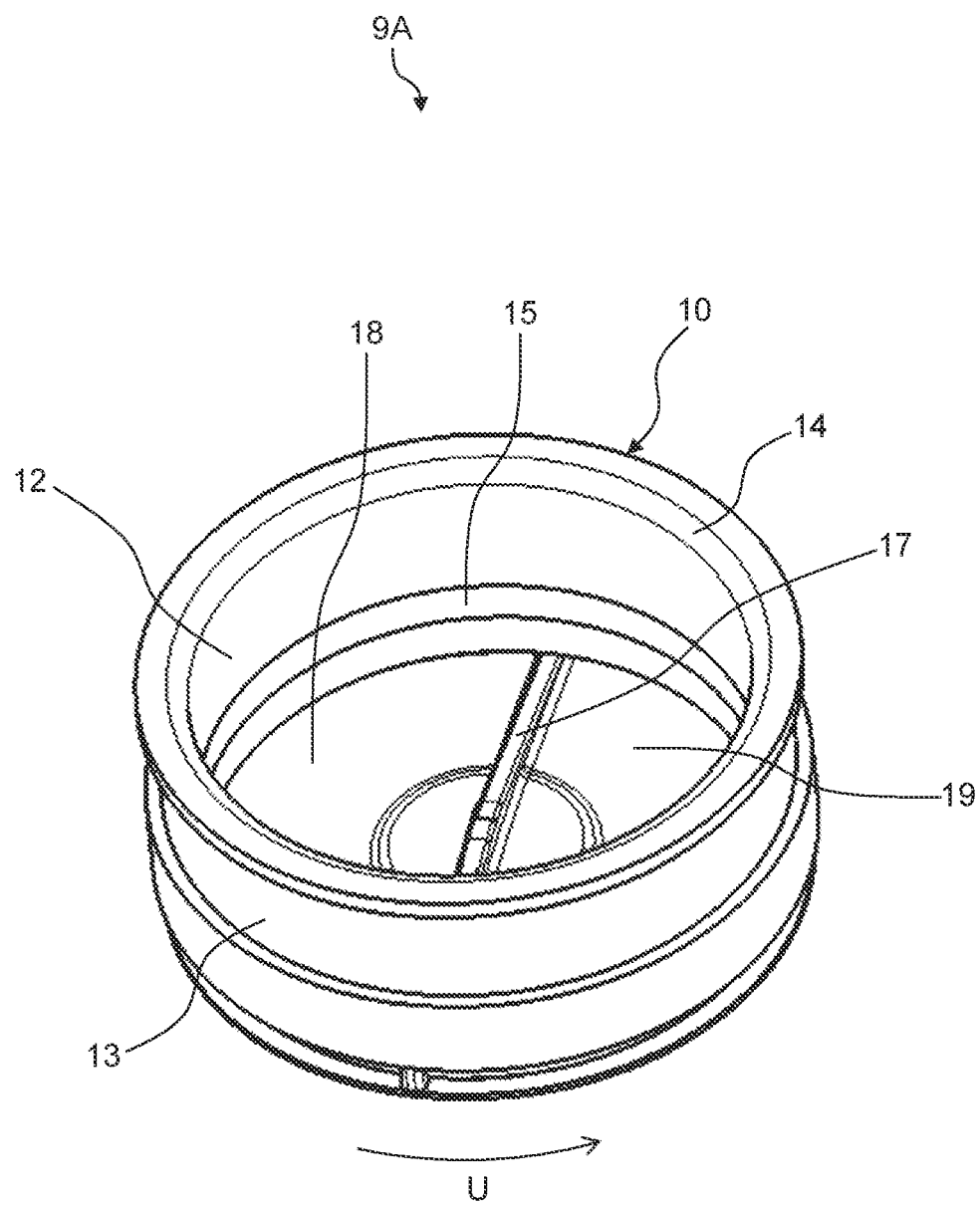
FIG. 2 shows a schematic perspective view of an embodiment of a particle discharge device for the filter assembly according to FIG. 1.
Figure 3:
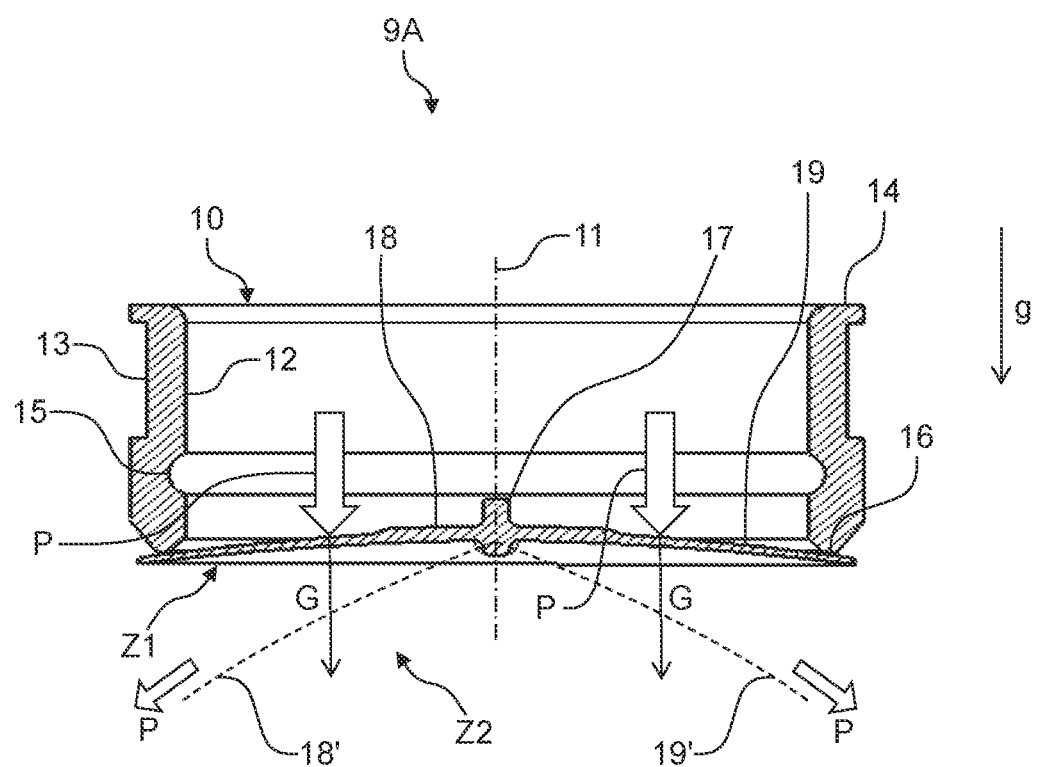
FIG. 3 shows a schematic section view of the particle discharge device according to FIG. 2.

FIG. 2 shows a schematic perspective view of an embodiment of a particle discharge device 9A. FIG. 3 shows a schematic section view of the particle discharge device 9A. In the following, reference is being had simultaneously to FIGS. 2 and 3.

The particle discharge device 9A comprises a housing 10 that is of a tubular configuration. The housing 10 is preferably embodied with rotational symmetry in relation to the central axis or symmetry axis 11. The symmetry axis 11 can be at the same time a symmetry axis of the particle discharge socket 8. The symmetry axis 11 extends in the gravity direction g or coincides therewith.

The housing 10 comprises a tubular base section 12 in which the particle discharge socket 8 can be received. An annular groove 13 is provided at the exterior at the base section 12 and extends circumferentially around it. The annular groove 13 is rectangular in cross section. In order to simplify pushing on the particle discharge device 9A onto the particle discharge socket 8, a bevel 14 is provided at the base section 12, in the orientation of FIG. 3 at the top side, and surrounds completely the symmetry axis 11.

In the orientation of FIG. 3, a circumferentially extending engagement section 15, which extends completely around the axis of symmetry 11, is provided below the annular groove 13 and inwardly at the base section 12. The engagement section 15 can be an annular groove with semi-circular cross section. The particle discharge socket 8 comprises a counter engagement section, for example, in the form of a circumferentially extending rib, which corresponds with the engagement section 15 and is suitable for engaging with form fit the engagement section 15. A form fit connection is produced by the mutual engagement or engagement from behind of at least two connecting partners, presently the engagement section 15 and the counter engagement section of the particle discharge socket 8. In this way, the particle discharge socket 9A can be fastened captively at the particle discharge socket 8.

The base section 12 comprises a valve seat 16, facing away from the bevel 14 and surrounding completely the symmetry axis 11. The valve seat 16 can be triangular in cross section. The valve seat 16 surrounds in an annular shape the symmetry axis 11. Viewed along a circumferential direction U of the housing 10, the valve seat 16 is of a circumferentially closed ring shape. The valve seat 16 is oriented perpendicularly to the symmetry axis 11. In the context of the invention, "perpendicular" is to be understood as an angle of 90°±10°, preferably of 90°±5°, further preferred of 90°±3°, further preferred of 90°±1°, further preferred of precisely 90°.

In addition to the base section 12, the housing 10 comprises a center stay 17 oriented perpendicularly to the symmetry axis 11 and connected at the ends to the base section 12 at both sides. A first particle discharge flap 18 as well as a second particle discharge flap 19 are connected with the center stay 17 to form one piece. The particle discharge flaps 18, 19 can also be referred to as valve plate, particle discharge lips or particle discharge valve bodies. The particle discharge flaps 18, 19 are elastically deformable and can be moved from a closed state Z1, in which the particle discharge flaps 18, 19 are resting against the valve seat 16, into an open state Z2, in which the particle discharge flaps 18', 19' are not resting against the valve seat 16. In the open state Z2, the particle discharge flaps are identified by the reference characters 18', 19' in FIG. 3. In the closed state Z1, the particle discharge flaps 18, 19 are oriented perpendicularly to the symmetry axis 11. In the closed state Z1, the particle discharge flaps 18, 19 are arranged inside, in particular at least partially inside, the housing 10.

The particle discharge device 9A is a plastic component. In particular, the particle discharge device 9A is an injection molded plastic component. In this context, the particle discharge device 9A is a one-piece or single-part, in particular monolithic component. In the context of the invention, "one-piece" or "single-part" means that the housing 10 together with the base section 12 and the center stay 17 as well as the particle discharge flaps 18, 19 form a common component and are not assembled of different components. This means that the particle discharge flaps 18, 19, the center stay 17, and the base section 12 can be separated from each other only by causing destruction thereof. In the context of the invention, "monolithic" means that the housing 10 together with the base section 12 and the center stay 17 as well as the particle discharge flaps 18, 19 are manufactured throughout of the same material. As material for the particle discharge device 9A, for example, rubber, an ethylene propylene diene rubber (EPDM), an acrylonitrile butadiene rubber (NBR) or a thermoplastic elastomer (TPE), for example, a thermoplastic polyurethane (TPU) are used.

When producing the particle discharge device 9A, the latter is manufactured as a one-piece component in a plastics injection molding tool. After removal of the particle discharge device 9A from the plastics injection molding tool, the particle discharge flaps 18, 19 are connected initially with the valve seat 16 as one piece. The particle discharge flaps 18, 19 are then separated from the valve seat 16 circumferentially completely around the symmetry axis 11. For this purpose, a separating manufacturing method is employed. For example, a knife, a blade, a cutting wheel, a laser cutting method or a waterjet cutting method can be used for separation of the particle discharge flaps 18, 19.

The particle discharge flaps 18, 19 are connected then only by means of the center stay 17 with the housing 10. However, a connection of the particle discharge flaps 18, 19 with the valve seat 16 may still remain in the region of the center stay 17.

The functionality of the particle discharge device 9A is as follows. Prior to starting operation of the internal combustion engine, the particle discharge flaps 18', 19' are in the open state Z2 due to their elastic deformability and their own weight. As soon as the internal combustion engine is started, the latter produces a vacuum which moves the particle discharge flaps 18, 19 into the closed state Z1 and sucks them against the valve seat 16. The particles P separated by the cyclone separators 7 from the raw air RO collect on the particle discharge flaps 18, 19 that are still in the closed state Z1.

The particle discharge flaps 18, 19 are moved from the closed state Z1 into the open state Z2 either by a weight force G of the particles P and/or by a load change of the internal combustion engine. The particles P can now drop in the gravity direction g out of the particle discharge device 9A. As soon as the weight force G is no longer loading the particle discharge flaps 18, 19 or as soon as the load change is completed, the particle discharge flaps 18, 19 are moved from the open state Z2 into the closed state Z1. The open state Z2 is maintained, for example, for a few fractions of a second to a few seconds.

Figure 4:
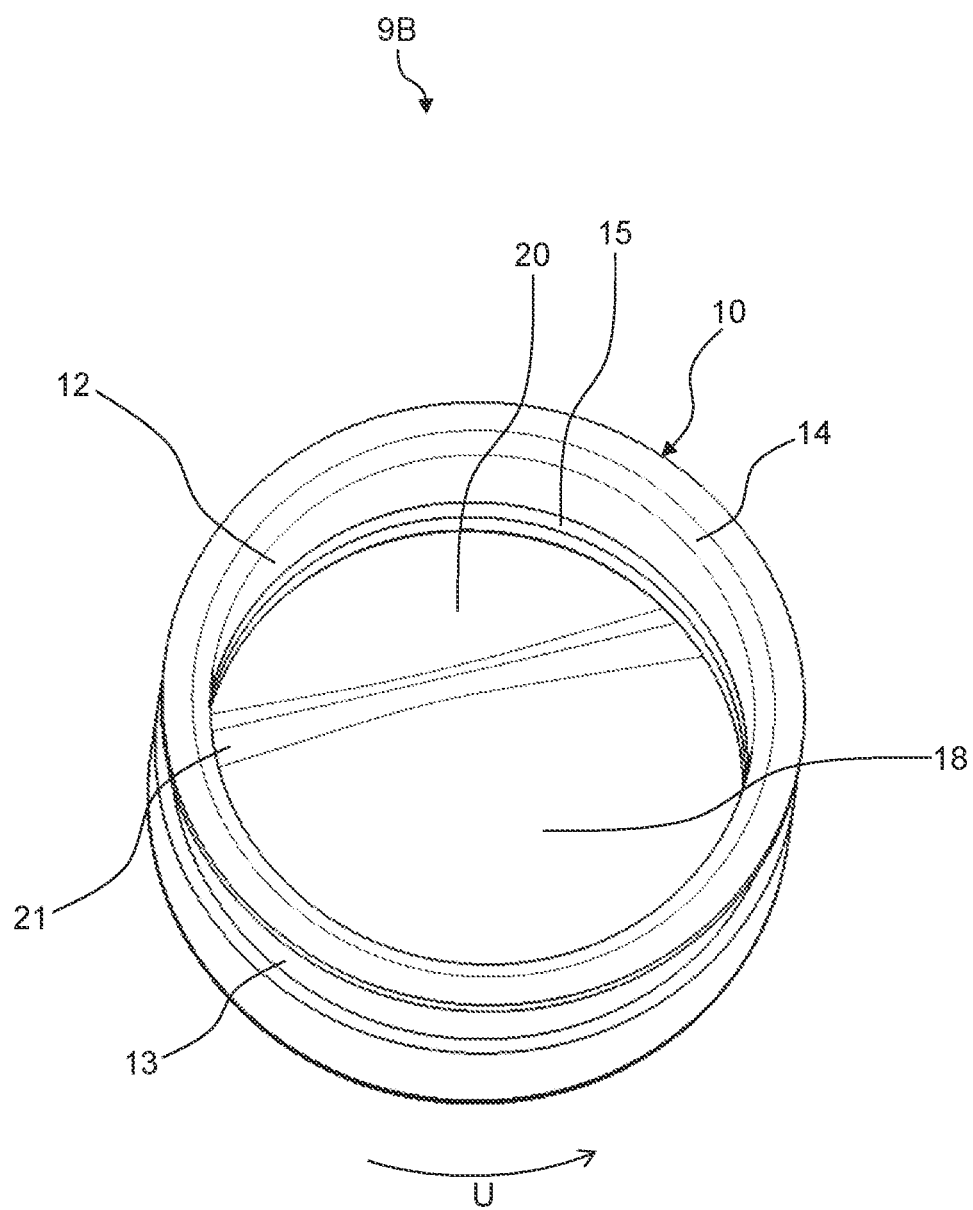
FIG. 4 shows a schematic perspective view of a further embodiment of a particle discharge device for the filter assembly according to FIG. 1.
Figure 5:
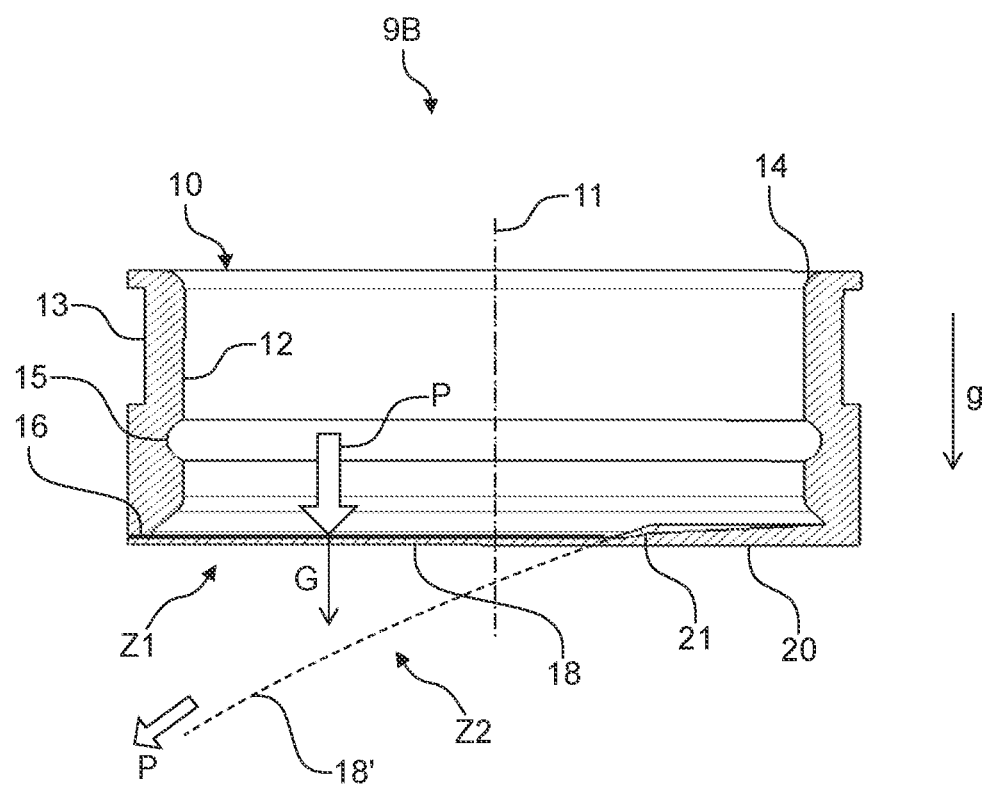
FIG. 5 shows a schematic section view of the particle discharge device according to FIG. 4.

FIG. 4 shows a schematic perspective view of a further embodiment of a particle discharge device 9B. FIG. 5 shows a schematic section view of the particle discharge device 9B. In the following, reference is being had simultaneously to FIGS. 4 and 5.

The particle discharge device 9B comprises, like the particle discharge device 9A, a housing 10 that is of a tubular configuration and is constructed with rotational symmetry in relation to a center axis or symmetry axis 11. The housing comprises a base section 12 with a circumferential annular groove 13, as explained above, a bevel 14, an engagement section 15 as well as a valve seat 16.

In contrast to the particle discharge device 9A, the valve seat 16 is however embodied so as not to extend completely around the symmetry axis 11. Viewed in a circumferential direction U of the housing 10, the valve seat 16 surrounds only partially the symmetry axis 11. For example, the valve seat 16 extends, viewed in the circumferential direction U, around two thirds of the circumference of the housing 10 around the symmetry axis 11.

In addition to the base section 12, the housing 10 comprises a bottom 20 which closes partially the base section 12 at the end face. The bottom 20 is connected as one piece, in particular monolithic, with the base section 12. At the bottom 20, precisely one particle discharge flap 18, as described above, is provided which is elastically deformable. The particle discharge flap 18 is connected by a hinge section 21 with the bottom 20. In this context, the particle discharge flap 18 comprises a reduced wall thickness in comparison to the bottom 20.

In contrast to the particle discharge device 9A, the particle discharge device 9B thus does not have two particle discharge flaps 18, 19 but only one particle discharge flap 18. The bottom 20 closes approximately one third of a cross-sectional area of the base section 12. The particle discharge flap 18, on the other hand, closes in a closed state Z1 thereof approximately two thirds of the cross-sectional area.

As mentioned before, the particle discharge device 9B is a one-piece, in particular monolithic, component, in particular an injection molded plastic component. The particle discharge device 9B is preferably an injection molded plastic component and can be manufactured, for example, of rubber, an EPDM, an NBR or a TPE. When producing the particle discharge device 9B, the particle discharge flap 18 is initially connected as one piece with the valve seat 16. In order to enable opening of the particle discharge flap 18, the particle discharge flap 18 is separated from the valve seat 16 after removal of the particle discharge device 9B from the plastics injection molding tool. This can be done, as previously described with reference to the particle discharge device 9A, by means of a separating manufacturing method.

The functionality of the particle discharge device 9B corresponds substantially to the functionality of the particle discharge device 9A. Initially, the particle discharge flap 18' is in an open state Z2. When starting operation of the internal combustion engine, the particle discharge flap 18' is moved from the open state Z2 into the closed state Z1 in which the particle discharge flap 18 is resting seal-tightly against the valve seat 16.

Particles P that collect in operation of the internal combustion engine on the particle discharge flap 18 act with their weight force G on the particle discharge flap 18 which in this way is moved from the closed state Z1 into the open state Z2 so that the particles P can be discharged. As an alternative or in addition, the particle discharge flap 18 can also be moved from the closed state Z1 into the open state Z2 and back by a load change of the internal combustion engine.

Figure 6:
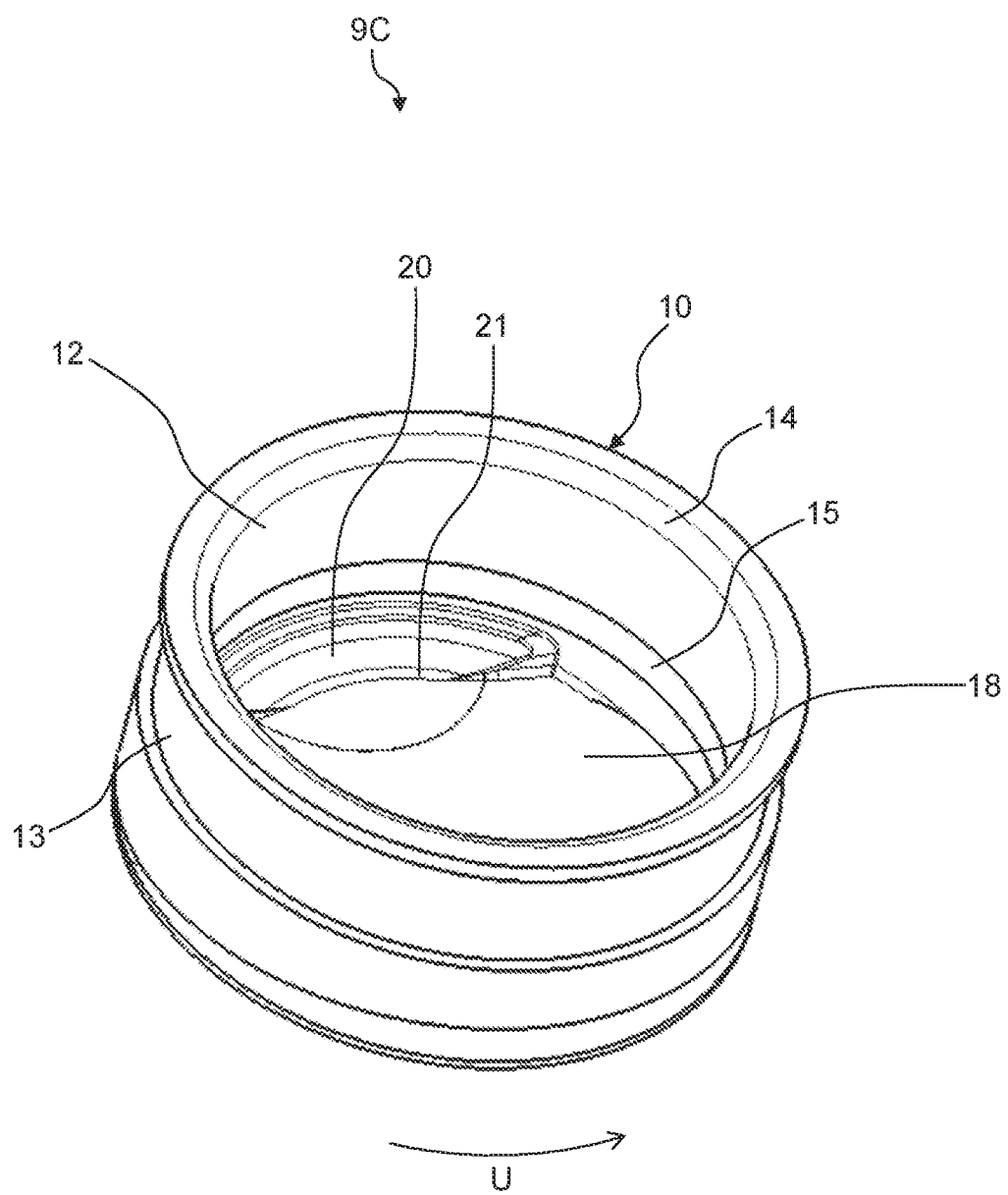
FIG. 6 shows a schematic perspective view of a further embodiment of a particle discharge device for the filter assembly according to FIG. 1.
Figure 7:
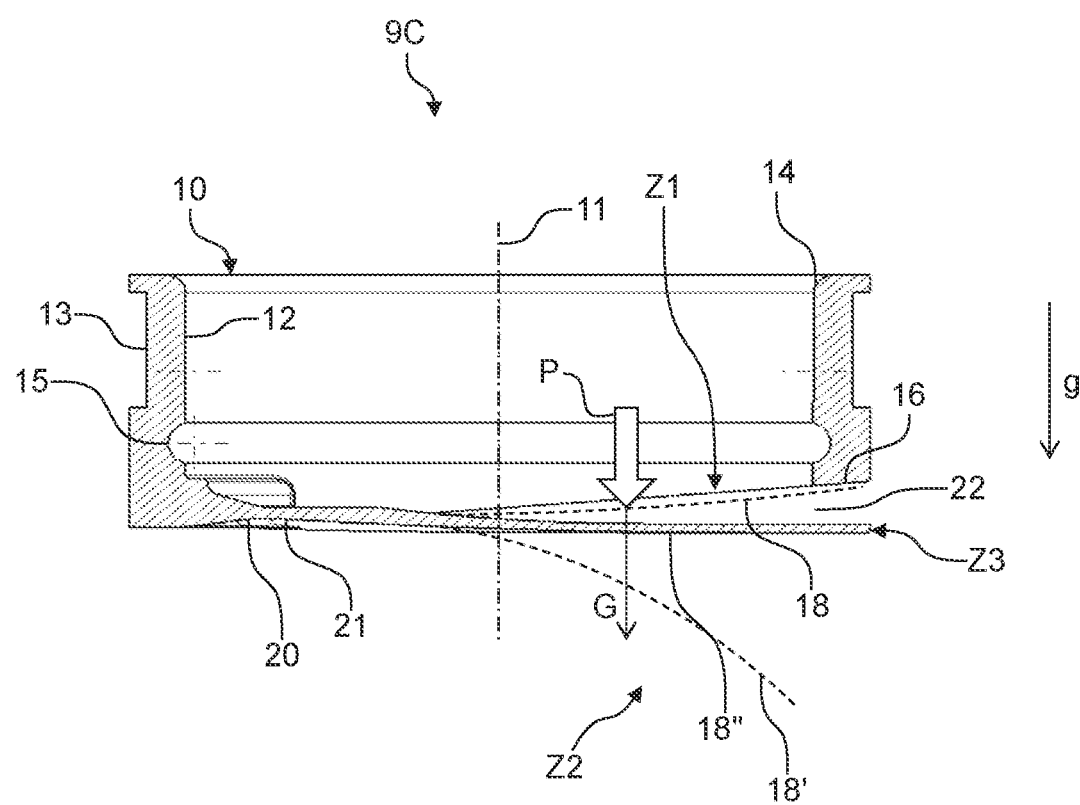
FIG. 7 shows a schematic section view of the particle discharge device according to FIG. 6.

FIG. 6 shows a schematic perspective view of a further embodiment of a particle discharge device 9C. FIG. 7 shows a schematic section view of the particle discharge device 9C.

The particle discharge device 9C comprises, like the particle discharge devices 9A, 9B, a housing 10 that is constructed with rotational symmetry in relation to the center axis or symmetry axis 11, with a base section 12 that comprises at the outer side a circumferentially extending annular groove 13 and at the inner side a bevel 14 and an engagement section 15. Moreover, at the base section 12 a valve seat 16 is provided. As in the particle discharge device 9B, the valve seat 16 does not extend completely around the symmetry axis 11 but only partially.

The housing 10, as in the particle discharge device 9B, is partially closed by means of a bottom 20. The bottom 20 closes approximately one third of a cross-sectional area of the base section 12. A particle discharge flap 18, as explained above, is formed integrally at the bottom 20 by means of a hinge section 21. The particle discharge flap 18, on the other hand, closes in a closed state Z1 thereof approximately two thirds of the cross-sectional area of the base section 12.

In contrast to the particle discharge device 9B, the particle discharge device 9C is manufactured such that the particle discharge flap 18 after removal of the particle discharge device 9C from a plastics injection molding tool is not connected as one piece with the valve seat 16. For this purpose, a gap 22 already provided in the plastics injection molding tool is positioned between the valve seat 16 and the particle discharge flap 18. This means that the particle discharge flap 18 must not be separated from the valve seat 16 after removal of the particle discharge device 9C.

FIG. 7 shows the particle discharge flap 18" in a removal state Z3. The particle discharge flap is identified with the reference character 18" in the removal state Z3. From the removal state Z3, the particle discharge flap 18" can be moved into the afore explained closed state Z1 and into an afore explained open state Z2. The removal state Z3 is located between the closed state Z1 and the open state Z2.

The particle discharge device 9C, like the particle discharge devices 9A, 9B, is a one-piece, in particular monolithic, component, in particular an injection molded plastic component. The particle discharge device 9C can be manufactured, for example, from rubber, an EPDM, an NBR or a TPE.

The afore explained different embodiments of the particle discharge device 9A, 9B, 9C combine a good discharge behavior while requiring minimal installation volume along the symmetry axis 11. By means of the particle discharge flap 18 or the particle discharge flaps 18, 19, a large open discharge cross section can be achieved. In this way, the discharge efficiency is very good and the clogging risk is very minimal.

Figure 8:
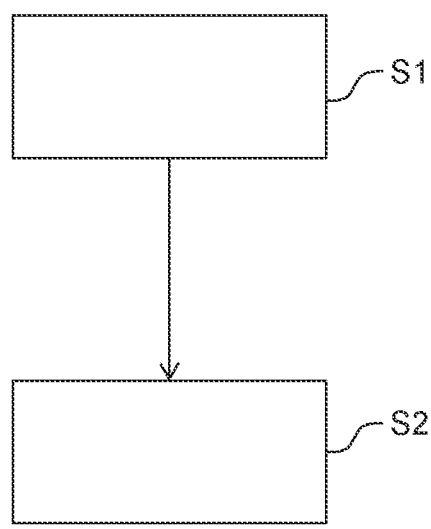
FIG. 8 shows a schematic block diagram of an embodiment of a method for producing a particle discharge device for the filter assembly according to FIG. 1.

In operation of the respective particle discharge device 9A, 9B, 9C, a continuous discharge of the particles P is observed. The increase of the weight force G on the particle discharge flap 18 or on the particle discharge flaps 18, 19 by the separated particles P effects a sudden opening of the respective particle discharge device 9A, 9B, 9C. Upon opening, a large cross section of the particle discharge socket 8 is released so that the particles P are discharged reliably. FIG. 8 shows a schematic block diagram of an embodiment of a method for producing a particle discharge device 9A, 9B, 9C as explained above. In the method, first in a step S1 the housing 10 is produced. At the same time, in a step S2 at least one particle discharge flap 18, 19 is formed as one piece with the housing 10. The steps S1 and S2 are preferably performed at the same time by means of a plastics injection molding tool.

After or during the step S2, the at least one particle discharge flap 18, 19 can be separated by means of a separating manufacturing method from the valve seat 16 of the housing 10. For the separating manufacturing method, for example, a blade, a knife, or a cutting wheel can be used. Alternatively, a laser cutting method or a waterjet cutting method can also be used however. Moreover, as explained above, already in the plastics injection molding tool the gap 22 can be provided so that a separation of the at least one particle discharge flap 18, 19 from the valve seat 16 is obsolete.

LIST OF REFERENCE CHARACTERS 1 filter assembly
2 filter housing
3 filter housing pot
4 filter housing cover
5 fastening section
6 fastening section
7 cyclone separator
8 particle discharge socket
9 particle discharge device
9A particle discharge device
9B particle discharge device
9C particle discharge device
10 housing
11 symmetry axis
12 base section
13 annular groove
14 bevel
15 engagement section
16 valve seat
17 center stay
18 particle discharge flap
18' particle discharge flap
18" particle discharge flap
19 particle discharge flap
19' particle discharge flap
20 bottom
21 hinge section
22 gap
g gravity direction
G weight force
RL clean air
RO raw air
P particles
S1 step
S2 step
U circumferential direction
Z1 closed state
Z2 open state
Z3 removal state

What is claimed is:

1. A filter assembly with a particle discharge device comprising:
  a filter housing comprising a centrifugal separator and a particle discharge socket;
  the particle discharge device comprising:
    a tubular housing having one or more particle discharge flaps, all formed as a single one-piece molded plastic component of a plastic elastically deformable elastomer material;
    the tubular housing comprising a valve seat;
a tubular base section of the tubular housing, projecting axially outwardly away from the one or more particle discharge flaps and having an open end configured to receive the particle discharge socket of the filter assembly;
wherein the valve seat surrounds at least partially a symmetry axis of the tubular housing;
wherein the one or more particle discharge flaps elastically bend or curve in an arc shape to move between the closed state and the open state;
wherein the open state is an initial state of the one or more particle discharge flaps, such that the one or more particle discharge flaps remain in the open state until the filter assembly introduces a vacuum into the particle discharge device, the vacuum applying a first biasing force acting directly onto the one or more particle discharge flaps, urging the one or more particle discharge flaps to bend or curve into the closed state, closing against the valve seat;
wherein the elastically deformable elastomer material is a reversible deformability, such that the one or more particle discharge flaps return to the open state when the first biasing force is removed,
wherein the plastic elastically deformable elastomer material is selected from the set consisting of: ethylene propylene diene rubber (EPDM), acrylonitrile butadiene rubber (NBR), a thermoplastic polyurethane (TPU).

2. The particle discharge device according to claim 1, wherein a second biasing force is a weight force generated by particles collecting on the one or more particle discharge flaps, the weight force urging the one or more particle discharge flaps to move towards the open state.

3. The particle discharge device according to claim 1, further comprising a center stay connected to the housing, wherein the one or more particle discharge flaps include a first particle discharge flap and a second particle discharge flap, wherein the first particle discharge flap and the second particle discharge flap are connected to the center stay, wherein the first particle discharge flap, the second particle discharge flap, and the center stay form together with the housing a one-piece component.

4. The particle discharge device according to claim 1, further comprising a bottom closing at least partially an end face of the housing, wherein precisely one particle discharge flap is provided, and wherein said one particle discharge flap and the bottom are embodied together as one piece.

5. The particle discharge device according to claim 1, wherein the valve seat completely surrounds the symmetry axis.

6. A method for producing a particle discharge device according to claim 1, the method comprising the steps:
a) producing the housing; and
b) producing the one or more particle discharge flaps as one piece together with the housing.

7. The method according to claim 6, further comprising separating the one or more particle discharge flaps from the valve seat of the housing by a separating manufacturing method during step b).

8. The method according to claim 6, further comprising separating the one or more particle discharge flaps from the valve seat of the housing by a separating manufacturing method subsequent to step b).

9. The particle discharge device according to claim 1, wherein
the tubular base section includes a circumferentially extending annular groove formed into a radially interior side of the tubular base section, the circumferentially extending annular groove configured of captively engage the particle discharge socket.

* * * * *